Figure 1:
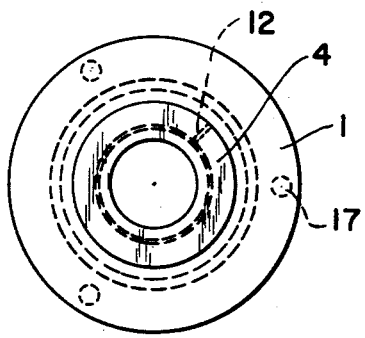

June 28, 1960     H. J. STEWART     2,942,868

SPRING AND HOLDER ASSEMBLY

Filed Aug. 1, 1958

INVENTOR.
Howard J. Stewart

BY *Christy, Parmelee & Strickland*

Attorneys.

United States Patent Office 2,942,868
Patented June 28, 1960

2,942,868

SPRING AND HOLDER ASSEMBLY

Howard J. Stewart, Washington Township, Westmoreland County, Pa., assignor to Union Spring and Manufacturing Co., New Kensington, Pa., a corporation of Pennsylvania Filed Aug. 1, 1958, Ser. No. 752,507

1 Claim. (Cl. 267—1)

The present invention relates to an assembly of ring-like springs upon a holder for functioning in proper sequence to obtain pre-determined load carrying capacities per unit of compression of the spring.

In the present invention the springs are of the coned disc type which have a maximum capacity with small deflection and occupying relatively small space. These springs have deflection characteristics depending upon the ratio of the dish of the disc to the thickness of metal. These deflection characteristics can be extended over large ranges by use of multiple discs of different thicknesses. This increases the necessity for retention of the springs in precise alignment. Frequently these spring assemblies are mounted in tubular containers and the size thereof to the spring holder must be maintained at a minimum.

Figure 3:
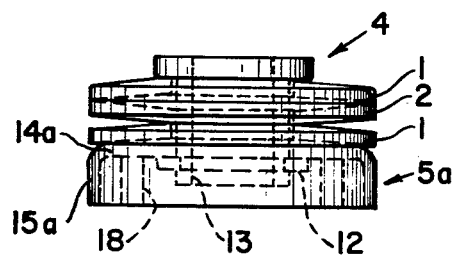
Figure 2:
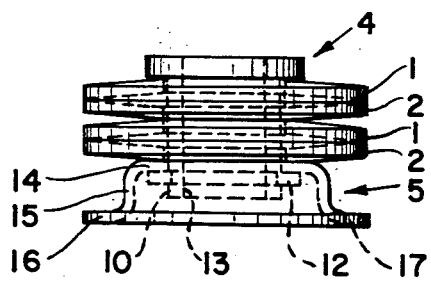
Figure 4:
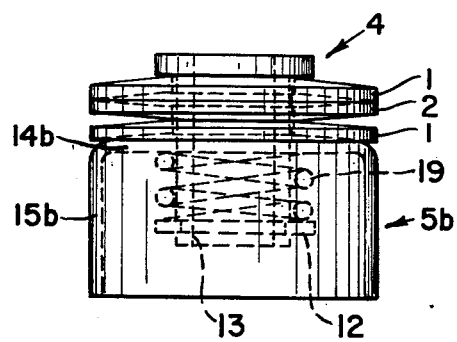
Figure 5:
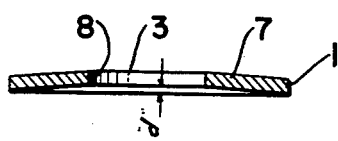
Figure 6:
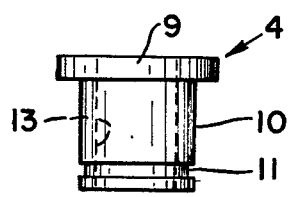

Referring now to the drawing forming part of the disclosure:

Fig. 1 shows a plan view of Fig. 2;
Fig. 2 shows a side elevation of a spring assembly;
Fig. 3 shows a side elevation of an alternate spring assembly;
Fig. 4 shows a side elevation of a second alternate spring assembly;
Fig. 5 shows a transverse section through a typical spring; and
Fig. 6 shows a detail of the bushing.

Referring now in detail to Figs. 1 and 2 of the drawings illustrating a spring assembly of alternately arranged springs in series, the number of springs may be two or multiples of two with the concave faces of the springs arranged in opposing relation. Each spring 1 and 2 is a circular disk which is "coned" or "dished" as shown in Fig. 5 and formed of heat treated steel, for example C-1095 or A.I.S.I. 6150. Extending concentrically through each spring 1 and 2 is an opening 3. Extending through each of the spring openings is a bushing 4 and continuing through the top wall of the base 5 is engaged by a snap ring 12 holding the assembly together.

Each spring as illustrated in Fig. 5, comprises an initially flat disk 7 having an opening 8 therein and thereafter dished as required as indicated at "d." Thereafter the spring is suitably heat treated. The thickness of the disk and the amount of dish "d," determines the capacity of the spring. The opening 8 provides a running fit for bushing 4 through the spring but prevents any substantial lateral displacement of one spring relative to the others in the group.

Each bushing 4 comprises a circular head portion 9 larger in diameter than spring opening 8, and a shank portion 10. Adjacent the lower end of shank portion 10 is an annular recess 11 adapted to receive a snap ring 12 to retain the bushing within the base. Where a large number of springs are mounted on the bushing, the lower end of the latter may be threaded to receive an adjusting nut and a jamb nut. Extending longitudinally of the bushing is a suitable sized opening 13 to receive a rod or bolt which extends through the entire assembly acting as a guide for a mechanism engaging the spring group.

The base 5 serves to provide a bearing surface for the spring groups and may be shaped to attach the spring assembly to a suitable bearing support. As shown in Fig. 2, the base is preferably a casting having a flat circular face 14 closing a hollow cylindrical wall portion 15 terminating in an annular flange 16. Suitable openings 17 in base flange 16 receive fasteners for attaching the base to a suitable support. The height of the base cylindrical wall portion 15 is slightly in excess of the length of the bushing shank within the base plus the total possible deflection of the groups of springs 1 and 2 so that the shank may move freely under spring deflection.

The base 5a of Fig. 3 has an enlarged hollow cylindrical wall portion 15a providing greater bearing surface for the spring group and is devoid of a base flange. Where a larger number of spring groups are mounted upon the bushing, reinforcements of the top wall 14 may be provided as in Fig. 3 by the annular member 18 or other suitable means.

The bases 5 and 5a may be of any suitable size. Where desirable the outside diameter of the bases may be the same as that of the spring disks. With such a construction the entire unit may be installed within a tubular member within which may also be received a member for bearing engagement upon the head of bushing for deflection of the springs.

As shown in Fig. 4, greater flexibility may be provided in the spring group by the addition of a helical coiled compression spring 19 within the base 5b between the web portion 14b and the snap ring 12.

I claim:

In a spring group of the character described, in combination, a hollow base member having a top wall providing a spring bearing surface, a bushing member arranged concentrically within the base member and having a shank portion extending through said base member top wall for longitudinal movement relative thereto, a head portion on said bushing shank portion, a plurality of coned spring disks mounted on said bushing shank between the bushing head portion and base member top wall, and means retaining said bushing, spring and base member in assembled relation, said means including helical coiled compression spring mounted on the bushing shank within the base between the base top wall and the end of the shank, and a detachable member securing the compression spring upon the said shank.

References Cited in the file of this patent

UNITED STATES PATENTS

| 104,907 | Vose | June 28, 1870 |
| 2,387,266 | Holland | Oct. 23, 1945 |
| 2,540,130 | Lee | Feb. 6, 1951 |
| 2,708,110 | Clay | May 10, 1955 |
| 2,867,434 | Johnson | Jan. 6, 1959 |